United States Patent [19]

Dragon

[11] 3,883,756

[45] May 13, 1975

[54] PULSE GENERATOR WITH AUTOMATIC TIMING ADJUSTMENT FOR CONSTANT DUTY CYCLE

[75] Inventor: Thomas J. Dragon, Southfield, Mich.

[73] Assignee: Burroughs Corporation, Detroit, Mich.

[22] Filed: Dec. 27, 1973

[21] Appl. No.: 428,730

[52] U.S. Cl. ................ 307/265; 307/228; 307/246; 307/273; 328/58; 328/185

[51] Int. Cl. ............................................ H03k 5/04

[58] Field of Search ........... 307/228, 246, 265, 273; 328/58, 146, 185

[56] References Cited

UNITED STATES PATENTS

| | | | |
|---|---|---|---|
| 3,484,624 | 12/1969 | Rasiel et al. | 307/265 |
| 3,569,842 | 3/1971 | Schroyer | 307/228 |
| 3,601,708 | 8/1971 | Stempler et al | 307/228 |
| 3,646,370 | 2/1972 | Lowe | 307/265 |
| 3,701,954 | 10/1972 | Seminatore et al. | 307/228 |
| 3,719,834 | 3/1973 | Dao | 307/246 |
| 3,727,081 | 4/1973 | Davis et al. | 307/246 |
| 3,742,257 | 6/1973 | Wittenzellner | 307/265 |
| 3,743,946 | 7/1973 | Gass et al. | 307/246 |
| 3,786,360 | 1/1974 | Kawa | 307/246 |
| 3,820,029 | 6/1974 | McKinley | 307/265 |

OTHER PUBLICATIONS

"Phase-Lockloop with Constant Duty Cycle" by Niccore in IBM Tech. Discl. Bulletin, Vol. 14, No. 6, Nov. 1971 Pages 1838–1839.

"Pulse Train Frequency Varied as Duty Cycle Stays Constant" by Ross in Electronics, July 21, 1969, Page 84.

"Duty Cycle is Constant at Any Trigger Frequency" by Klein in Electronics, July 26, 1965, Pages 62–63.

*Primary Examiner*—Stanley D. Miller, Jr.
*Attorney, Agent, or Firm*—Franklin D. Ubell; Edwin W. Uren; Kevin R. Peterson

[57] ABSTRACT

A circuit for generating a waveform comprising a train of rectangular pulses in response to a train of trigger signals such that the duration of each rectangular pulse is a precise multiple of the time lapse between pulses, in spite of variation in the waveform's absolute period. The circuit employs a flip-flop set by a trigger signal and timed to reset by a ramp signal-to-reference voltage comparison circuit. The output of the flip-flop is subject to continuous adjustment by the circuit to achieve the desired waveform, and to this end is monitored by a first discharging current source producing a fixed current and activated by the set state and a second charging current source producing a fixed multiple, the desired time lapse multiple, of the first current and activated by the reset state. Should one of the current sources be kept on too long by a deviation of the relative pulse (set) and lapse (reset) durations from the desired multiple, a capacitor driven by the two sources will be relatively over-or undercharged, depending on which current source is overactivated, and the charge and hence voltage change will be monitored to adjust the reference voltage to return to the desired timing multiple.

5 Claims, 6 Drawing Figures

PULSE GENERATOR WITH AUTOMATIC TIMING ADJUSTMENT FOR CONSTANT DUTY CYCLE

BACKGROUND OF THE INVENTION

This invention relates generally to timing circuitry for producing a waveform comprising a train of rectangular pulses in response to a succession of trigger signals and specifically to circuitry for insuring that the duration of each rectangular pulse is a precise multiple of the time lapse between rectangular pulses.

Such circuitry finds particular use in magnetic read-write systems employing double frequency phase encoding such as that disclosed in patent application Ser. No. 224,781 and now U.S. Pat. No. 3,803,388 filed Feb. 9, 1972, by Albert G. Williamson et al. for an "Automatic Reading and Writing Mechanism For Bank Passbooks and the Like" and assigned to the present assignee. In such systems, the decoding of data is dependent on the coincidence or non-coincidence of a data-bearing signal with a rectangular pulse. The data is borne between synchronizing trigger pulses, which generate the rectangular pulse, and these trigger pulses may be spaced at different time intervals, depending on such parameters as bit density and reading speed. To detect the data properly, it is essential that the rectangular timing pulse last for a specified percentage of the time interval between trigger pulses, in spite of variations in that interval.

Circuits are known in the prior art for generating trains of rectangular pulses in response to fixed interval trigger signals such that the duration of the rectangular pulse is, to an approximation, a multiple of the time lapse between rectangular pulses. Such circuits commonly employ a flip-flop whose output is first triggered to a high state by a trigger signal, driving a ramp generator. The ramp voltage is compared to a reference voltage by a differential amplifier and when the two voltages are equal, a signal is generated to reset the flip-flop. The ramp signal thus times the duration of the high state, which is the rectangular output pulse, while the low state endures until the next trigger signal again sets the flip-flop.

Such circuitry is incapable of automatically compensating for variation in timing between trigger signals to maintain a constant ratio between the duration of the rectangular pulse and the time lapse between the rectangular pulses because the duration of the timing ramp cannot vary as the trigger signal period varies. Furthermore, even if the trigger signal period were to remain constant, the prior art circuitry cannot compensate for variation resulting from nonideality of component performance, wear, temperature effects and other factors. These considerations make the prior art circuitry especially unsuited to double frequency phase encoding applications where the duration of the rectangular pulse is a critical link in bit detection.

SUMMARY OF THE INVENTION

It is, therefore, an object of the invention to improve rectangular pulse generators.

It is another object of the invention to adapt a rectangular pulse generator to accommodate the bit detection requirements of a communication system employing double frequency phase encoding.

It is yet another object of the invention to provide automatic timing circuitry for precisely controlling the timing accuracy of a rectangular pulse generator.

It is a particular object of the invention to produce a waveform comprising a train of rectangular pulses whose duration is automatically adjusted and controlled to be a precise multiple of the time lapse between pulses, in spite of variation in trigger signal or waveform period.

Accordingly, the invention contemplates alleviation of the insufficiencies of the prior art by providing a controlled duration rectangular pulse generator including circuitry for compensating for variations in the ratio of pulse duration to time lapse between pulses by providing a voltage parameter dependent on this ratio to automatically adjust the duration of the pulse generator's timing signal.

These and other objects and advantages are accomplished by controlling the duration of a trigger-set first flip-flop output state in accordance with the duration of a precise ramp function. The ramp is initiated upon entrance of the flip-flop into the first state and is terminated upon its attaining the value of an automatically adjustable reference voltage.

The reference voltage is adjusted by the voltage on a capacitor chargeable by either of two current sources. One source is activated by the first state to produce a fixed first discharging current, and the other is activated upon termination of the first state to produce a charging current that is a fixed multiple of the first current, the multiple being the desired multiple of time lapse between pulses. Should one of the sources be kept on too long by a deviate relative pulse duration, the capacitor will be over- or undercharged, depending on which source is overactivated, and the reference circuit voltage will be correspondingly adjusted to correct the ramp function and hence the rectangular pulse duration.

BRIEF DESCRIPTION OF THE DRAWINGS

The foregoing objects and advantages of the invention, together with other advantages obtainable by its use, will be apparent from the following detailed description of the invention read in conjunction with the drawings in which.

DETAILED DESCRIPTION OF THE PREFERRED EMBODIMENT

Figure 1:
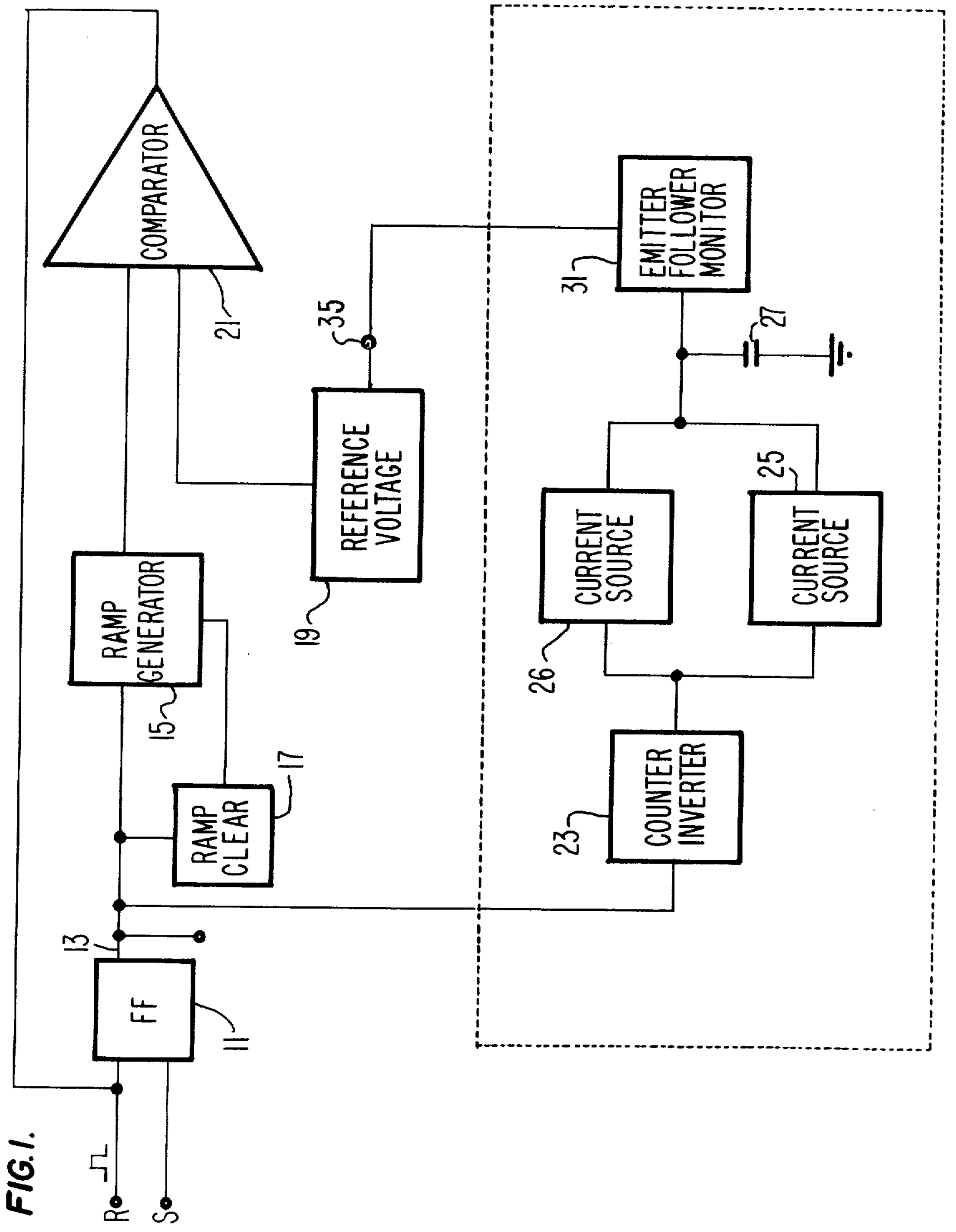
FIG. 1 is a schematic block diagram of the preferred embodiment of the invention.

Referring to FIG. 1, the basic circuitry for generating a wavetrain of rectangular pulses, according to a block approach, includes a flip-flop 11 having a set input, a reset input and an output 13; a ramp generator 15 and a ramp-clear circuit 17, both driven by the flip-flop 11; a reference voltage circuit 19; and a comparator amplifier 21 for comparing the reference and ramp voltages and resetting the flip-flop 11 via the reset terminal when the ramp and reference voltages are equal.

The automatic adjusting circuitry of the preferred embodiment of the invention numbered generally as 10 is also shown in block form in FIG. 1. The output 13 of the flip-flop 11 also is transmitted to counter-inverter circuitry 23 to produce an inverted form of the flip-flop output voltage, which is then fed to the inputs of two current sources 25, 26. The current sources 25, 26 alternatively drive a control capacitor 27 whose voltage is monitored and fed to the reference voltage source 19 by an emitter follower monitor circuit 31.

Essentially, a trigger signal is applied to the set terminal causing the flip-flop output 13 to go high and initiating the ramp generator 15, which runs until its voltage reaches that of the reference 19. At that time, the comparator 21 triggers the reset terminal and the flip-flop output 13 goes low, terminating the rectangular output pulse and activating the ramp-clear circuitry 17. Thus, the length of the ramp determines the length of the rectangular pulse at the flip-flop output 13.

When the trigger pulse drives the flip-flop output 13 high, a low signal is fed by the inverter circuitry 23 of the invention to the current sources 25, 26 activating the first current source 26, which begins to discharge the control capacitor 27 at a fixed rate. When the flip-flop output signal goes low, a high signal triggers the second current source 25 which charges the capacitor 27 at a different but fixed rate. The charging rates are determined by selecting the ratio of the fixed currents so that the control capacitor 27 voltage becomes higher or lower if either current source 25, 26 functions longer than the desired shape of the flip-flop output pulse would dictate. The voltage monitor circuitry 31 then feeds an indication of this voltage to the reference 19, whose voltage is correspondingly increased or reduced in order to correct for the duration of the ramp pulse from the generator 15.

Figure 2:
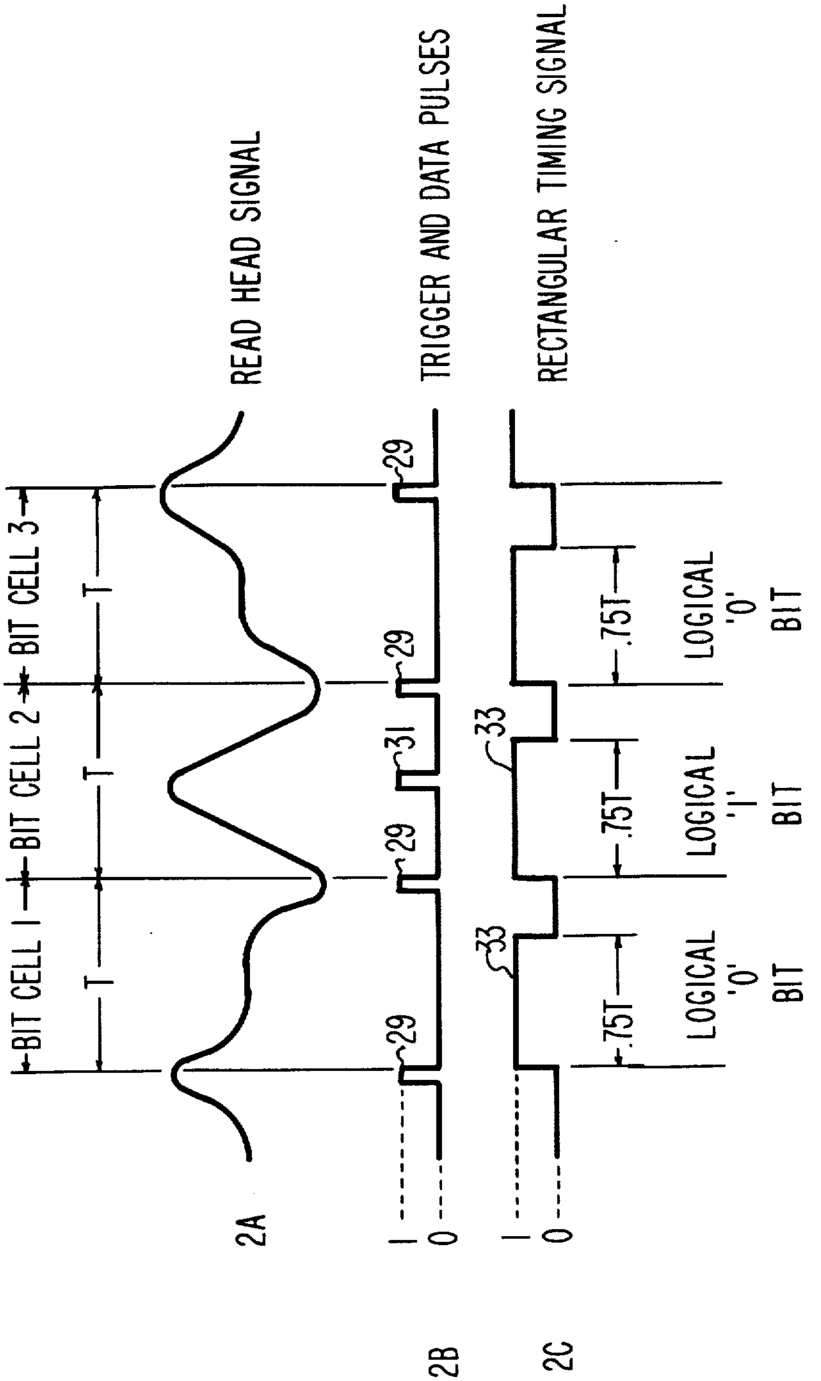
FIG. 2 is a timing diagram illustrating the relationship of various signals in the preferred embodiment.

In one system incorporating the invention, for example, trigger signals 29 and data pulses 31 (FIG. 2B) are obtained from a magnetic read head signal (FIG. 2A). These trigger 29 and data 31 pulses are to be compared with a rectangular timing signal (FIG. 2C) such as that generated by the preferred embodiment of the invention herein described.

The time period between trigger signals is known as a "bit-cell" in the particular scheme of encoding involved, and data is indicated by the presence or absence of a data pulse within a certain interval between trigger pulses. Data is detected by the coincidence of a data pulse and a rectangular timing pulse initiated by the preceding trigger signal. To illustrate, when a data pulse 31 occurs during that part of a cell period T when a rectangular pulse 33 also occurs, (Cell 2, FIG. 2B, C) a 1 bit is detected, whereas if no data pulse appears during the interval of the rectangular pulse 33, (Cell 1, FIG. 2B, C) a 0 bit is detected.

As indicated in FIG. 2C, the preferred embodiment of the invention is adapted to maintain a rectangular pulse during three fourths of a cell period (.75*T*) with a spacing or lapse of one fourth of a cell period (.25*T*) between successive rectangular pulses. In other words, the ratio of the duration of a rectangular pulse to the time lapse between pulses is to be 3:1. This ratio must be maintained regardless of the absolute value of *T*, which may vary considerably as previously discussed.

Furthermore, in such a system, it is desirable to precede the data with a series of 0 bits (such as in Cell 1, FIG. 2) called a "preamble." This preamble signal is used to adjust the read head signal level through automatic gain controls (not shown) as well as to activate the automatic timing circuitry of the present invention before actual data is read. In order to cooperate with the preamble signal, the preferred embodiment incorporates counter circuitry which is not essential to the invention.

Figure 3:
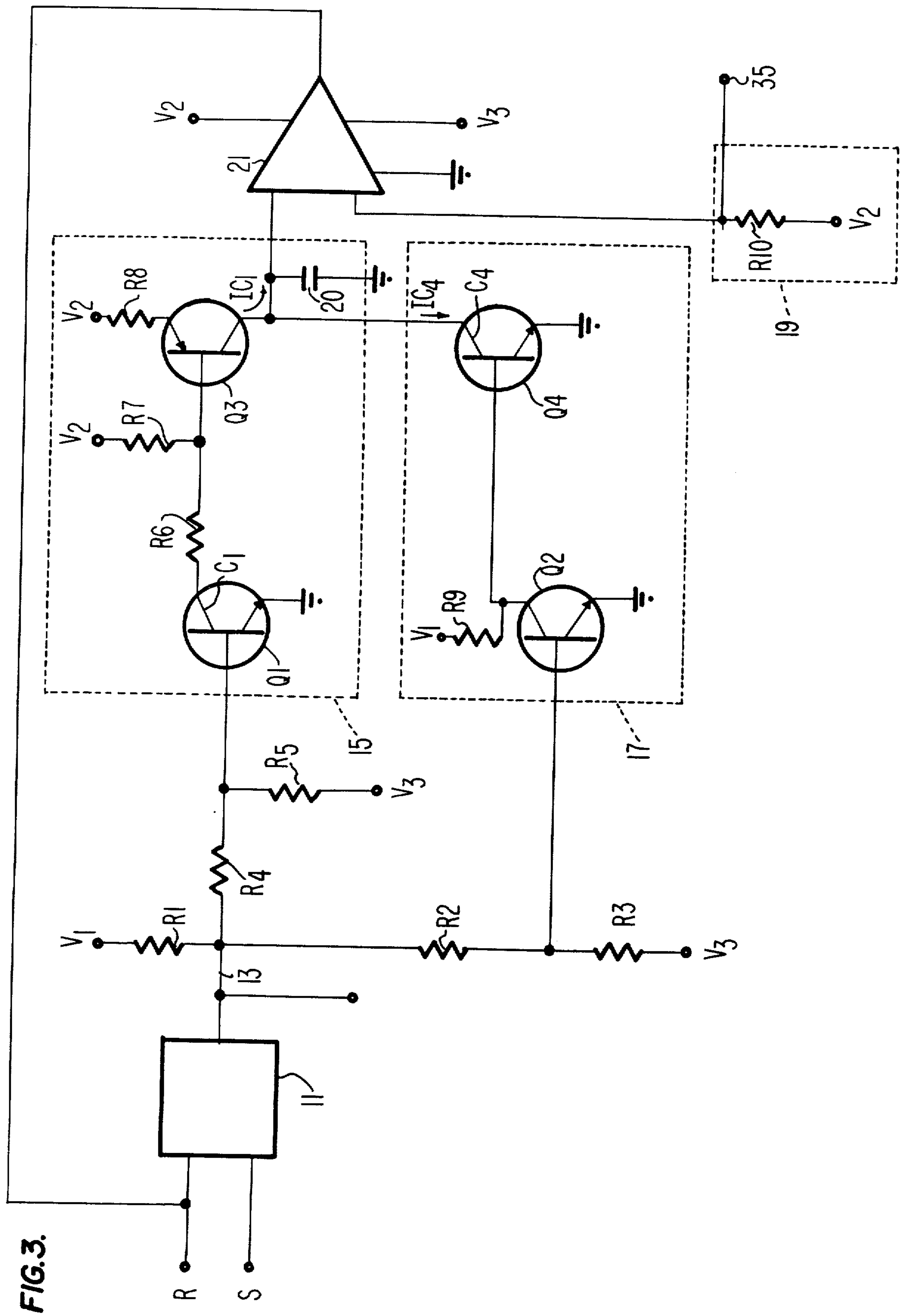
FIG. 3 is a circuit diagram of the basic pulse-forming circuit of the preferred embodiment.

With this background, a more particularized discussion may be entered upon with reference to the pulse generator circuitry of FIG. 3 showing more detailed construction of ramp generator 15, flip-flop 11, ramp clear circuit 17, comparator 21 and reference voltage source 19. The flip-flop output 13 is connected to a resistive biasing network utilizing a positive reference voltage source $V_1$ and a negative reference voltage source $V_3$ for determining the voltage at the respective base terminals of an NPN ramp-initiate transistor $Q_1$ and an NPN ramp-clear blocking transistor $Q_2$ such that when the flip-flop output 13 is high both transistors $Q_1$ and $Q_2$ are on and when the flip-flop output 13 is low both transistors $Q_1$ and $Q_2$ are off, as known in the art.

The collector $c_1$ of ramp-initiate transistor $Q_1$ is connected via resistor $R_6$ to the base of PNP ramp-driver transistor $Q_3$, which is biased by resistors $R_7$ and $R_8$ through a positive voltage source $V_2$. The ramp-driver $Q_3$ has its collector connected to the ungrounded terminal of a capacitor 20.

The ungrounded terminal of the capacitor 20 is also connected to one input of the comparator amplifier 21 and to the collector $c_4$ of an NPN ramp-clear transistor $Q_4$. The ramp-clear transistor $Q_4$ has its base connected in common with the collector of the ramp-clear blocking transistor $Q_2$ and bias resistor $R_9$.

The comparing amplifier 21 is connected for operation as is well-known in the art and receives another input from the voltage reference source 19 comprising a resistor $R_{10}$ and the constant voltage source $V_2$. The output of the comparing amplifier 21 is fed to the reset terminal of the flip-flop 11.

In operation, a trigger pulse (FIG. 4A) hits the set input of the flip-flop 11, triggering its output high (FIG. 4B), turning on ramp-clear blocking and ramp-initiating transistors $Q_1$ and $Q_2$. Conduction of ramp-clear blocking transistor $Q_2$ drops the base of ramp-clear transistor $Q_4$ to ground, turning off the ramp-clear transistor $Q_4$ and effectively removing it from the circuit.

At the same time, ramp-driver transistor $Q_3$ is turned on by a constant base voltage supplied by the conduction of ramp-initiate transistor $Q_1$ and the biasing action of resistors $R_6$, $R_7$, and $R_8$. Since the base voltage is constant, a constant charging current $Ic_1$ is fed by the ramp-driver $Q_3$ to the capacitor 20. The high input impedance of the comparing amplifier 21 prevents it from distorting the constancy of the charging current $Ic_1$. Since the capacitor 20 is fed with a constant current, the voltage across it increases linearly with time, creating a ramp signal voltage (FIG. 4C), which is monitored by the comparing amplifier 21.

When the linearly increasing ramp reaches the value of the reference voltage 19, the comparing amplifier senses the equality and triggers the flip-flop reset terminal, causing the flip-flop output 13 to change state to a low level. The ramp-initiate transistor $Q_1$ is then turned off by the low voltage, causing the voltage at the base of the ramp-driver $Q_3$ to rise instantly to $V_2$, thus terminating the operation of the ramp-driver $Q_3$.

At this point, the capacitor 20 is left charged with a voltage equal to the reference. To prepare for the next ramp generation, the capacitor 20 must be quickly discharged.

The necessary discharge of capacitor 20 is accomplished simultaneously with the cessation of ramp generation by the ramp-clearer $Q_4$, as follows. When the flip-flop output 13 goes low, the ramp-clear blocking transistor $Q_2$ is turned off, raising the base of the ramp-clear transistor $Q_4$ to the positive supply voltage $V_1$. The ramp-clear transistor $Q_4$ is thus switched on, and its collector current $Ic_4$ instantly draws the charge from the capacitor 20, readying the capacitor 20 for another ramp generation operation.

Considering the discussion of the circuit as thus far disclosed, it is apparent that the duration of the flip-flop set or "high" state, representative here of the desired rectangular pulse, is equivalent to the duration of the linearly increasing ramp pulse. The duration of the ramp pulse depends upon the voltage reference value, which is initially set in the preferred embodiment to cut off the ramp pulse and trigger the flip-flop low when the ramp has endured for $0.75T$ — three quarters of a constant, known bit cell period.

Figure 4:
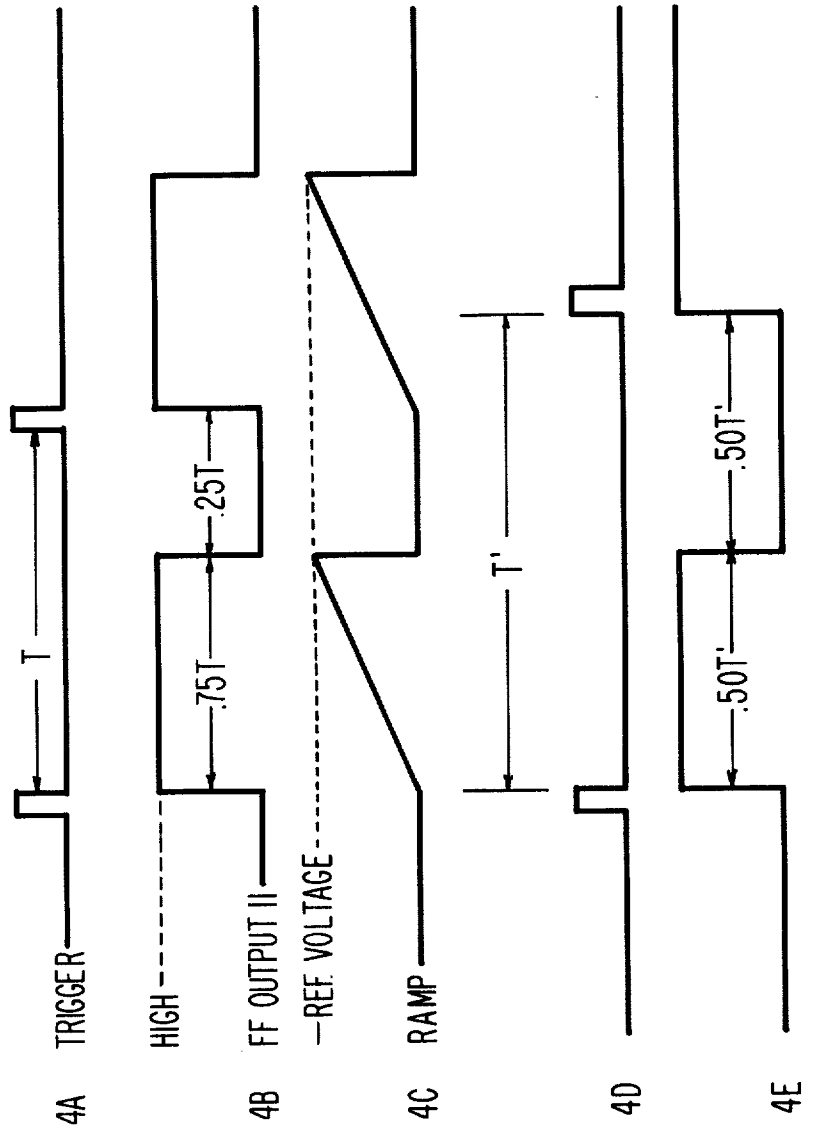
FIG. 4 is a timing diagram of waveforms produced in the circuitry of FIG.3.
Figure 5:
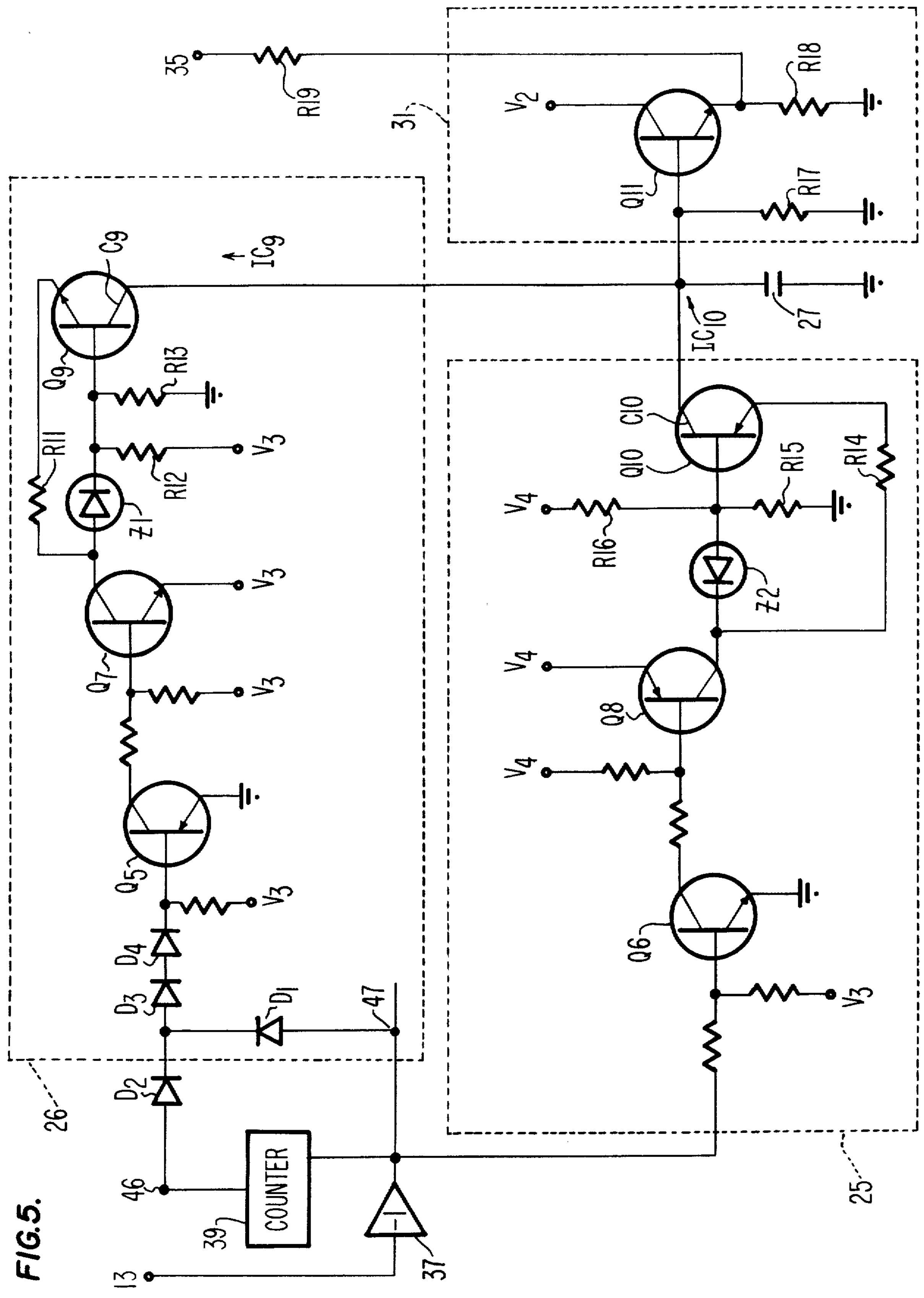
FIG. 5 is a circuit diagram of automatic adjusting circuitry of the preferred embodiment.

As is further apparent, the circuitry as so far described cannot accommodate varying bit cell periods effectively. For example, if the bit cell period alluded to earlier were to lengthen by $0.25T$, establishing a new absolute period $T'$, as shown in FIGS. 4D and 4E, the ramp signal generated would still be identical to that just described and would be cut off after the same absolute duration as determined by the fixed reference voltage. Thus, the desired ratio, $0.75T'$ to $0.25T'$, would no longer be maintained but would be changed to $0.50T'$ to $0.50T'$. A data pulse which occurred within the portion of the proper bit detection range between $0.50T'$ and $0.75T'$ would thus go undetected. To prevent such a result and maintain the desired ratio 3:1 in spite of bit cell period changes or other fluctuation inherent in the previously described circuitry, the invention employs additional automatic timing circuitry, numbered generally as 10 in FIG. 1, which is linked with the just described circuitry (FIG. 3) at the output 13 of the flip-flop 11 and at a terminal 35 of the voltage reference network 19 as hereinafter described with reference to FIG. 5.

This automatic timing circuitry 10 includes an inverter 37 and counter 39, whose construction and operation are well-known in the art. The output of the inverter 37 and counter 39 network drives a charging current source 25 and a discharging current source 26 through the bases of NPN current source switching transistor $Q_6$, and PNP current source switching transistor $Q_5$ and diodes $D_1$, $D_2$, $D_3$, and $D_4$, which insure proper triggering of the switching transistors $Q_5$ and $Q_6$.

The collector of the switching transistor $Q_5$ is connected to the base of an intermediate transistor $Q_7$, whose collector is coupled to the anode of a zener diode $Z_1$ and one terminal of a collector resistor $R_{11}$. The cathode of the zener diode $Z_1$ is connected to the base of a current source transistor $Q_9$, to a grounded biasing resistor $R_{13}$ and to negative reference $V_3$ through a resistor $R_{12}$. The emitter of the current source transistor $Q_9$ is connected to the other terminal of the collector resistor $R_{11}$, and the collector $c_9$ of transistor $Q_9$ is connected to the control capacitor 27.

Similarly, the collector of switching transistor $Q_6$ is connected to the base of an intermediate transistor $Q_8$, whose collector is coupled to the cathode of the zener diode $Z_2$ as well as one terminal of a collector resistor $R_{14}$. The anode of the zener diode $Z_2$ is connected to the base of the current source transistor $Q_{10}$, to the grounded biasing resistor $R_{15}$ and to a positive bias voltage source $V_4$ through a resistor $R_{16}$. The emitter of the current source transistor $Q_{10}$ is connected to the other terminal of the collector resistor $R_{14}$, and its collector $c_{10}$ is connected to the control capacitor 27.

The voltage developed across the control capacitor 27 is tapped by the emitter follower monitoring network 31 including a transistor $Q_{11}$ connected in conventional emitter follower configuration. The emitter follower, as is well-known in the art, provides a signal indicative of the voltage on the control capacitor 27 through a resistor $R_{19}$ to a terminal 35 of the voltage reference circuit 19 of FIG. 3.

In operation, the counter 39 holds the voltage on the anode 47 of the diode $D_1$ low and the voltage on the anode of diode 46 high during the first eight preamble pulses, thereby holding both current sources, 25, 26 off. This hold-off period allows the automatic gain circuitry to operate and prevents possible false starts resulting from system noise. During this time, the control capacitor 27 voltage is at a D.C. level. After the eighth pulse, the hold-off signals are removed and the output 13 of the flip-flop 11 is fed through the inverter 37 to the inputs of the current sources 25, 26. thus, both current sources 25, 26 are presented with an inverted form of the timing signal generated at the output 13 of the flip-flop 11.

During the rectangular pulse duration (ideally $0.75T$), the output of the inverter 37 is low, turning off the switching transistor $Q_6$, effectively removing the charging current source 25 from the circuit. At the same time, the switching transistor $Q_5$ is switched on, activating the intermediate and current source transistors $Q_7$ and $Q_9$ and hence the discharging current source 26.

The voltage at the collector of the intermediate transistor $Q_7$ is then essentially at the negative source voltage $V_3$, and the zener diode $Z_1$ thus fixes a constant voltage on the base of the current source transistor $Q_9$. In this condition, the collector current $Ic_9$ is determined by the value of the emitter resistor $R_{11}$. This current is withdrawn from the control capacitor 27, thus discharging it. In the preferred embodiment, the zener voltage and emitter resistor $R_{11}$ values are chosen to provide a collector current $Ic_9$ exactly 1 miliampere (Ma) in magnitude.

The charging current source 25 begins to function similarly when the rectangular pulse at the flip-flop output 13 is triggered off and low, thus driving the signal at the inverter 37 output high. The switching transistor $Q_6$ is thereby turned on, activating the intermediate and current source transistors $Q_8$, $Q_{10}$ while the switching transistor $Q_5$ is turned off, effectively removing the discharging current source 26 from the circuit. The circuit cooperating with the switching transistor $Q_6$ functions just as that described for the transistor $Q_5$ with the zener diode $Z_2$ and emitter resistor $R_{14}$ being set to provide a collector current $Ic_{10}$ of 3 miliamps (ma) to the control capacitor 27. The control capacitor voltage is buffered by the emitter follower monitor circuit 31 whose output is fed as a correction signal through a resistor $R_{19}$ to the reference circuit 19 of FIG. 3 via a terminal 35 and acts with resistor $R_{10}$ and the voltage source $V_2$ (FIG. 3) to supply the reference signal to the comparator amplifier 21.

Now the adjusting operation of the two current sources 25, 26 functions as follows. While the pulse at the flip-flop output 13 is high, 1 ma is being withdrawn from the control capacitor 27. While it is low, 3 ma is being fed to the control capacitor 27. If the pulse generating circuit is performing ideally, that is, producing a rectangular pulse enduring three times as long as the lapse between pulses, the flip-flop output 13 is high for three times as long as it is low. Thus 1 ma would be withdrawn from the control capacitor 27 for three times as long as 3 ma would be supplied. The net charge change would zero and the voltage on the capacitor held at a constant average value. The signal waveform of the control capacitor voltage in this case is shown in FIG. 6A, where $V_c$, as in FIG. 6B and C, symbolizes the maximum control capacitor voltage reached when no ratio adjustment is required.

Figure 6:
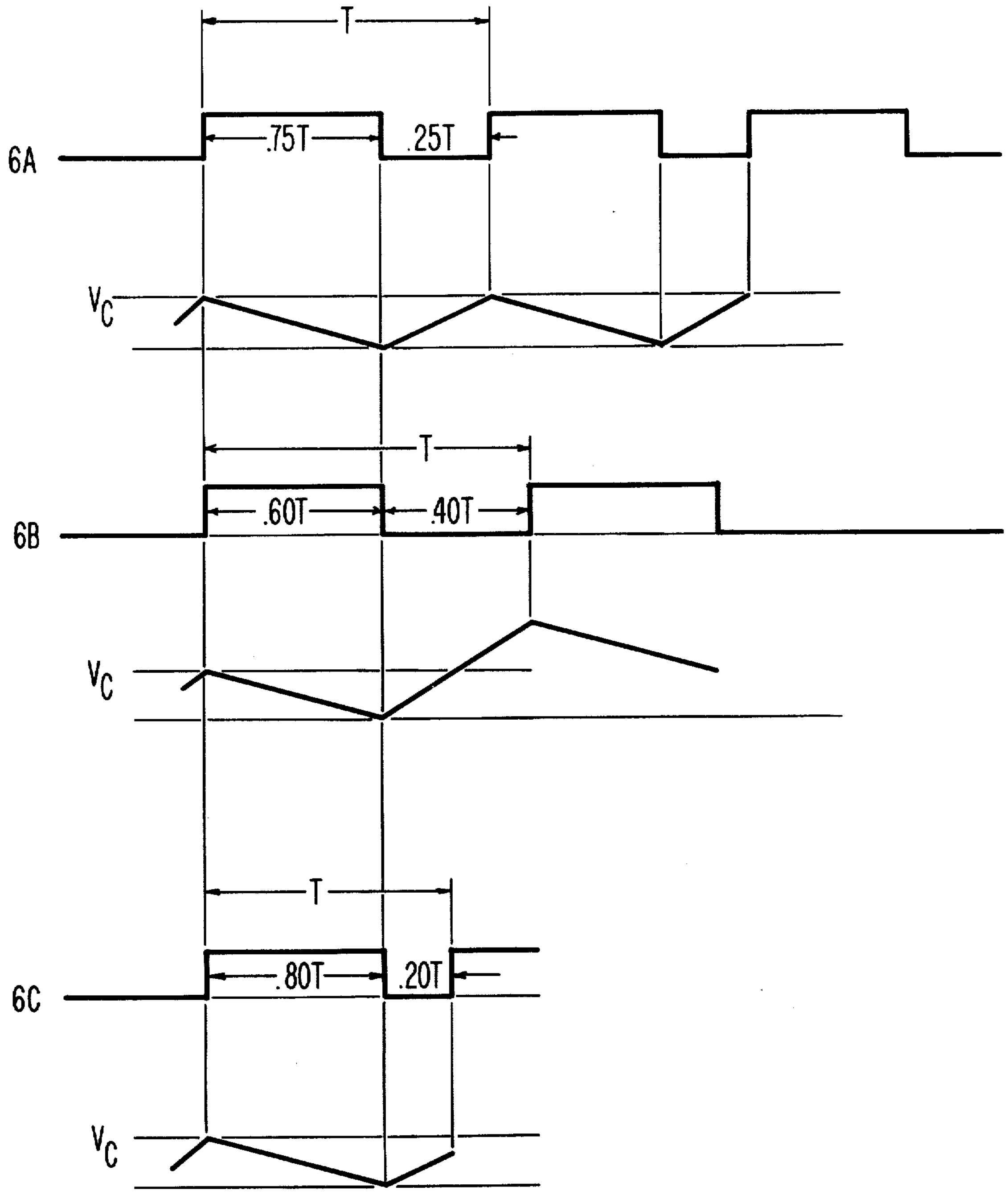
FIG. 6 is a timing diagram illustrating the automatic adjusting operation of the preferred embodiment of the invention.

If however, the duration of the rectangular pulse at the output should dip to $0.60T$ as shown conceptually in FIG. 6B, the 1 ma current will be on a lesser time and will remove charge proportional to $0.60T$ (1) = 0.60Tma, while the 3 ma current will endure for $0.40T$, adding charge equal to $0.40T$(3ma) = 1.20Tma. Thus, charge will increase and with it the voltage across the control capacitor 27. In turn, the emitter follower 31 will feed a higher voltage to the reference circuit 19, resulting in a higher overall reference voltage. Consequently, the duration of the ramp function will increase as the ramp rises to meet the higher reference level, thereby withholding the reset signal to the flip-flop 11 for a longer time and increasing the duration of the output 13 pulse back toward the desired $0.75T$ value.

On the other hand, should the rectangular pulse endure too long, for example, for $0.80T$ as illustrated in FIG. 6C, the charge withdrawn from the control capacitor 27 during a period will be $0.80T$(1ma) = 0.80Tma while that added will be only $0.20T$(3ma) = .60Tma so that a net decrease in control capacitor voltage will result. This decreased voltage will ultimately decrease the reference voltage, shortening both the duration of the ramp produced by the ramp generator 15 and the duration of the rectangular timing pulse at the flip-flop output 13.

Thus, the circuit responds to any deviation from the desired ratio of durations to adjust the reference voltage and return the waveform to the desired ratio.

Many changes in the preferred embodiment are possible without departing from the spirit of the invention. For example, the flip-flop "low" state might be the one set by the trigger signal with the circuitry correspondingly easily adapted by one skilled in the art to accommodate such a change. Furthermore, the counter circuitry is not essential to the invention and many types of the circuitry configurationss employed such as ramp generators and clearers, comparators, current sources and reference voltage sources may be used. It is therefore to be understood that within the scope of the appended claims, the invention may be practiced otherwise than as herein disclosed.

What is claimed is:

1. Circuitry for generating a train of substantially rectangular pulses in response to a train of trigger signals comprising:

flip-flop means having set and reset states and an output, said output being set by each of said trigger signals, to initiate a said rectangular pulse;

means for generating ramp voltage signals having identical initial levels, each generation being activated when said flip-flop means is set and deactivated when said flip-flop means is reset;

reference means for generating a reference voltage level;

means for resetting said flip-flop upon equality of said reference and ramp voltages to terminate a said rectangular pulse; and means for automatically varying said reference voltage level in accordance with the variation in the time lapse between said pulses so as to maintain the duration of said rectangular pulses as a constant multiple of said time lapse between said pulses.

2. The pulse-generating circuitry of claim 1 wherein said automatic duration varying means comprises:

means activated only by said set state for producing a first constant current;

means activated only by said reset state for producing a second current having a magnitude which is said multiple of said first current; and charge accumulating means oppositely charged by said first and second currents for maintaining an average charge level for controlling said reference level.

3. The pulse-generating circuitry of claim 2 wherein said first and second current producing means each includes:

a driver transistor having two main current-carrying electrodes and a control electrode, the first of said current-carrying electrodes being connected to said accumulating means; and means connected to the second current carrying electrode and said control electrode for actuating said driver transistor and holding a constant actuating voltage on said control electrode.

4. The pulse-generating circuit of claim 3 wherein said actuating and holding means includes:

a switching transistor connected for supplying a constant voltage at one of its electrodes upon actuation;

a zener diode connected between said constant voltage electrode and said control electrode; and a resistor connected between said second current-carrying electrode and said constant voltage electrode.

5. The pulse generating circuit of claim 2 further including a transistor configured as an emitter-follower for coupling said charge accumulating means to said reference means.

* * * * *